(12) United States Patent
Lee et al.

(10) Patent No.: US 10,070,287 B2
(45) Date of Patent: Sep. 4, 2018

(54) METHOD AND APPARATUS FOR ENERGY ADAPTIVE RESOURCE ALLOCATION IN ENERGY HARVESTING NETWORK

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Dong In Kim, Seongnam-si (KR); Min Gyu Lee, Seongnam-si (KR); Hyeong Kyu Lee, Bucheon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 67 days.

(21) Appl. No.: 15/450,880

(22) Filed: Mar. 6, 2017

(65) Prior Publication Data

US 2017/0257728 A1     Sep. 7, 2017

(30) Foreign Application Priority Data

Mar. 7, 2016    (KR) .................. 10-2016-0027022

(51) Int. Cl.
*H04L 12/26*   (2006.01)
*H04W 4/38*    (2018.01)
*H04L 29/08*   (2006.01)
*H04W 72/04*   (2009.01)
*H04W 74/02*   (2009.01)

(52) U.S. Cl.
CPC ............. *H04W 4/38* (2018.02); *H04L 67/12* (2013.01); *H04W 72/04* (2013.01); *H04W 74/02* (2013.01)

(58) Field of Classification Search
CPC ....... H04W 4/38; H04W 74/02; H04W 72/04; H04L 67/12
See application file for complete search history.

(56) References Cited

U.S. PATENT DOCUMENTS 9,874,923 B1 *   1/2018   Brown .................... H04W 4/70

FOREIGN PATENT DOCUMENTS

KR         10-1627465 B1      6/2016

OTHER PUBLICATIONS

Jo, So Young, et al. "Adaptive Transmission Control Algorithm for Wireless Sensor Networks with Energy Harvesting." *The 2014 Fall Conference of the Korean Institute of Communications and Information Sciences* (2014) (3 pages, with English abstract).

(Continued)

*Primary Examiner* — Afshawn M Towfighi
(74) *Attorney, Agent, or Firm* — NSIP Law

(57) ABSTRACT

A method and apparatus for energy adaptive resource allocation in energy harvesting network are provided. The method includes: allocating, by an energy adaptive resource allocation apparatus, non-competition slots of a next frame to at least one first wireless communication device whose energy queue state exceeds a predetermined threshold value among wireless communication devices succeeded in data transmission; and allocating, by the energy adaptive resource allocation apparatus, competition slots of the same number as that of at least one third wireless communication device expected to attempt data transmission to the next frame in consideration of a harvested energy amount and an average energy harvesting rate of at least one second wireless communication device.

19 Claims, 9 Drawing Sheets

(56) References Cited

OTHER PUBLICATIONS

Korean Notice of Allowance dated Nov. 22, 2016 in counterpart Korean Patent Application No. 10-2016-0027022 (2 pages, in Korean).
Lee, Hyungkyu, et al. "Hybrid Mac Protocol in Energy Harvesting IoT Network." *The 2015 Summer Conference of the Korean Institute of Electromagnetic Engineering and Science* (2015) (39 pages, with partial English translation).

* cited by examiner

Number of IoT devices

US 10,070,287 B2

METHOD AND APPARATUS FOR ENERGY ADAPTIVE RESOURCE ALLOCATION IN ENERGY HARVESTING NETWORK

CROSS-REFERENCE TO RELATED APPLICATION

This application claims priority to and the benefit of Korean Patent Application No. 10-2016-0027022 filed in the Korean Intellectual Property Office on Mar. 7, 2016, the entire contents of which are incorporated herein by reference.

BACKGROUND OF THE INVENTION

Technical Field

The present invention relates to a method of controlling access of a wireless communication device, and more particularly, to a method of controlling access for high-efficiency communication of a wireless communication device in an energy harvesting network environment.

Description of Related Art

In an IoT network environment, IoT devices use a limited energy storage device such as a battery or a capacitor and consume energy in a data collection and transmission process. There is a problem that the IoT device cannot perform a continuous operation during a long period due to a limited energy storage device. Nowadays, as technology that can solve an operation limit problem due to a limited battery of an IoT device, energy harvesting technology has been in the spotlight. Energy harvesting technology is technology that generates electric energy from an energy source existing in a peripheral environment such as solar light, a heat, a pressure, and an electromagnetic wave. Because electric energy is generated through energy harvesting, the IoT device can continuously communicate even without battery exchange. In such an energy harvesting IoT network, the number of operable IoT devices changes according to a harvested energy amount and a consumed energy amount (i.e., according to an energy queue state of devices) and thus a method of adaptively managing a radio resource is required.

In an existing Framed Slotted ALOHA (F-ALOHA) protocol, every frame has a structure configured with the fixed number of slots and has a structure repeated on a time axis. The IoT device selects a random slot within a frame and transmits data at the selected slot. A length of a frame is generally represented with the number of slots constituting the frame. When a frame is terminated, slots constituting the frame may be classified into a success slot, a collision slot, and an idle slot. When only one IoT device transmits data at one slot, the one slot becomes a success slot, and when at least two IoT devices transmit data at one slot, the one slot becomes a collision slot. When no device transmits data at one slot, the one slot becomes an idle slot.

A frame of the F-ALOHA protocol is configured with a control slot and competition slots. The control slot includes a synchronization signal for synchronizing between an Access Point (AP) and an IoT device and ACK of an IoT device succeeded in data transmission at competition slots of a previous frame. The competition slots are used when IoT devices transmit data to an AP. The IoT device selects a random slot among competition slots within a frame and transmits data at the slot.

FIG. 1 is a diagram illustrating an operation example of an F-ALOHA protocol in a network configured with an AP and four IoT devices. In FIG. 1, B is a control slot in which the AP transmits a synchronization signal and ACK information to IoT devices. S means a success slot, C means a collision slot, and I means an idle slot. In FIG. 1, a frame length is fixed to 5. First, the AP transmits a synchronization signal at a control slot with the start of the frame and transmits an ACK signal to the IoT device succeeded in data transmission at a previous frame. At an (i−1)th frame, IoT device 1 selects a first competition slot to transmit data. Because the number of IoT device, having transmitted data at the first competition slot is one, the IoT device 1 succeeds in data transmission. IoT device 2 transmits and succeeds in data transmission at a fourth competition slot of the (i−1)th frame. IoT devices 3 and 4 simultaneously transmit data at a third competition slot of the (i−1)th frame and thus collision occurs. Because no IoT devices transmit data at the second competition slot, the second competition slot becomes an idle slot. The AP notifies the start of the frame through a control slot of an i-th frame and transmits ACK to the IoT devices 1 and 2 succeeded in data transmission at the (i−1)th frame. At the i-th frame, the entire four IoT devices select different competition slots and succeed in data transmission.

FIG. 2 is a diagram illustrating an operation example of an F-ALOHA protocol in an energy harvesting environment. It is assumed that a communication environment of FIG. 2 is a communication environment in which four energy harvesting IoT devices transmit data to one AP. In FIG. 2, E represents energy of an IoT device, and H represents an energy amount in which the IoT device harvests at an (i−1)th frame. Here, energy represents an energy amount charged at a battery of the IoT device, and it is assumed that an energy block is used as a basic unit and energy is configured with maximum five energy blocks. When the IoT device transmits data at an arbitrary frame, the IoT device transmits one data and uses one energy block. The IoT device may perform energy harvesting at every slot to increase energy thereof, and when the energy is larger than a specific threshold value $E_{min}$, the IoT device may transmit data. In FIG. 2, it is assumed that $E_{min}=0$.

At the (i−1)th frame of FIG. 2, the IoT devices 1 and 2 each individually select a first competition slot and a fourth competition slot and succeed in data transmission. As the IoT devices 1 and 2 each use one energy block, respective energies become 3 and 0. At the (i−1)th frame, as the IoT devices 3 and 4 simultaneously select the third competition slot, collision has occurred, and respective energies become 2 and 0. At a control slot of an i-th frame, the IoT devices update energy information including harvested energy at the (i−1)th frame. At the (i−1)th frame, the IoT devices 1 and 3 each acquire one energy block through energy harvesting and thus respective energies become 4 and 3. The IoT devices 2 and 4 do not succeed in energy harvesting at the (i−1)th frame and thus both energies thereof become 0. At the i-th frame, because the respective energies of IoT devices 2 and 4 do not exceed an energy threshold value ($E_{min}=0$), the IoT devices 2 and 4 do not transmit data but perform only energy harvesting. In the IoT devices 1 and 3, because respective energies thereof exceed $E_{min}$, the IoT devices 1 and 3 attempt data transmission at the i-th frame. The IoT device 1 and 3 each select a first competition slot and a third competition slot at the i-th frame and succeed in data transmission.

In the F-ALOHA protocol, because a frame length is fixed, there is a merit that a protocol is simply implemented. However, when a fixed frame length is used, as shown in FIG. 2, a problem occurs that efficiency of data transmission is deteriorated. For example, within one frame, when so many IoT devices attempt data transmission, compared with a frame length, collision occurs in most competition slots and thus communication between the IoT device and the AP is difficult, and when the small number of IoT devices transmit data to the AP, compared with a frame length, most competition slots become an idle slot to waste a radio resource.

When energy harvesting is available, the number of IoT devices that attempt data transmission varies according to energy of the IoT device. There is a drawback that the F-ALOHA protocol does not correspond to a change of the number of transmittable IoT devices. In FIG. 2, at the i-th frame, because the number of IoT devices that attempt data transmission is two and a frame length is 4, a situation occurs in which two competition slots are wasted. That is, when the number of IoT devices that attempt data transmission is smaller than a frame length, a slot resource is wasted, and in an environment in which the number of IoT devices that attempt transmission changes according to such an energy state, a resource efficiency problem of the F-ALOHA protocol is worsened. Therefore, in an IoT network in which energy harvesting is considered, it is inefficient to use the F-ALOHA protocol, a research on a Medium Access Control (MAC) protocol is required that can adaptively use a resource to the number of IoT devices varying according to an energy change.

SUMMARY OF THE INVENTION

The present invention has been made in view of the above problems and provides a method and apparatus for enhancing resource efficiency by adapt resource allocation flexibly to changing energy of IoT devices in an energy harvesting network.

In accordance with an aspect of the present invention, there is provided a method for energy adaptive resource allocation in energy harvesting network. The method for energy adaptive resource allocation in energy harvesting network includes: allocating, by an energy adaptive resource allocation apparatus, non-competition slots of a next frame to at least one first wireless communication device whose energy queue state exceeds a predetermined threshold value among wireless communication devices succeeded in data transmission; and allocating, by the energy adaptive resource allocation apparatus, competition slots of the same number as that of at least one third wireless communication device expected to attempt data transmission to the next frame in consideration of a harvested energy amount and an average energy harvesting rate of at least one second wireless communication device.

The at least one second wireless communication device may be a wireless communication device that does not receive allocation of the non-competition slots among wireless communication devices connected to the energy adaptive resource allocation apparatus.

The method may further include determining, by the energy adaptive resource allocation apparatus, slots succeeded in data transmission at a current frame.

The method may further include allocating competition slots corresponding to the number of wireless communication devices that are connected to the energy adaptive resource allocation apparatus to a first frame.

The method may further include broadcasting, by the energy adaptive resource allocation apparatus, control information to wireless communication devices connected to the energy adaptive resource allocation apparatus at a control slot.

The control information may include: at least one of a synchronization signal, a size of a corresponding frame, the number of competition slots, the number of non-competition slots, and a data transmission state at a competition slot of a previous frame, wherein the data transmission state includes success, collision, and idle, and an information of wireless communication devices to transmit at the non-competition slots.

The method may further include receiving, by the energy adaptive resource allocation apparatus, data including an average energy harvesting rate and an energy queue state having an energy amount harvested from the at least one first and at least one third wireless communication devices.

Wireless communication devices succeeded in energy harvesting may update the average energy harvesting rate when succeeding in energy harvesting.

When the wireless communication device connected to the energy adaptive resource allocation apparatus is unsuccessful even one time in data transmission to the energy adaptive resource allocation apparatus due to collision or energy shortage, the energy adaptive resource allocation apparatus may fixedly allocate the competition slots corresponding to the number of the unsuccessful wireless communication devices, average energy harvesting rates of which are unknown.

In accordance with another aspect of the present invention, there is provided an energy adaptive resource allocation apparatus in an energy harvesting wireless communication network. The energy adaptive resource allocation apparatus in an energy harvesting wireless communication network includes: a slot allocation unit that allocates a non-competition slot and a competition slot of a next frame in consideration of an energy amount and an average energy harvesting rate of wireless communication devices.

The slot allocation unit may allocate non-competition slots of a next frame to at least one first wireless communication device whose energy queue state exceeds a predetermined threshold value among wireless communication devices succeeded in data transmission and allocate competition slots of the same number as that of at least one third wireless communication device expected to attempt data transmission to the next frame in consideration of a harvested energy amount and an average energy harvesting rate of at least one second wireless communication device.

The at least one second wireless communication device may be a wireless communication device that does not receive allocation of the non-competition slots among wireless communication devices connected to the energy adaptive resource allocation apparatus.

The slot allocation unit may determine slots succeeded in data transmission at a current frame.

The slot allocation unit may allocate competition slots corresponding to the number of connected wireless communication devices at a first frame.

The energy adaptive resource allocation apparatus may further include a transmitting unit that broadcasts control information to the connected wireless communication devices at a control slot.

The control information may include: at least one of a synchronization signal, a size of a corresponding frame, the number of competition slots, the number of non-competition slots, and a data transmission state at a competition slot of a previous frame, wherein the data transmission state may include success, collision, and idle; and an information of wireless communication devices to transmit at the non-competition slots.

The energy adaptive resource allocation apparatus may further include a receiving unit that receives data including an average energy harvesting rate and an energy queue state having an energy amount harvested from the at least one first and at least one third wireless communication devices.

Wireless communication devices succeeded in energy harvesting may update the average energy harvesting rate when succeeding in energy harvesting.

When the wireless communication device connected to the energy adaptive resource allocation apparatus is unsuccessful even one time in data transmission to the energy adaptive resource allocation apparatus due to collision or energy shortage, the slot allocation unit may fixedly allocate competition slots corresponding to the number of the unsuccessful wireless communication devices, average energy harvesting rates of which are unknown.

A method and apparatus for energy adaptive resource allocation suggested in the present invention can allocate a resource according to an energy change in communication between a wireless communication device and an AP in an energy harvesting environment. An Energy-adaptive Hybrid Medium Access Control (EH-MAC) protocol suggested in the present invention allocates a frame length adaptively to the number of wireless communication devices that attempt dynamically changing transmission according to an energy queue state in an energy harvesting environment, thereby enhancing resource use efficiency.

DETAILED DESCRIPTION OF THE INVENTION

Figure 1:
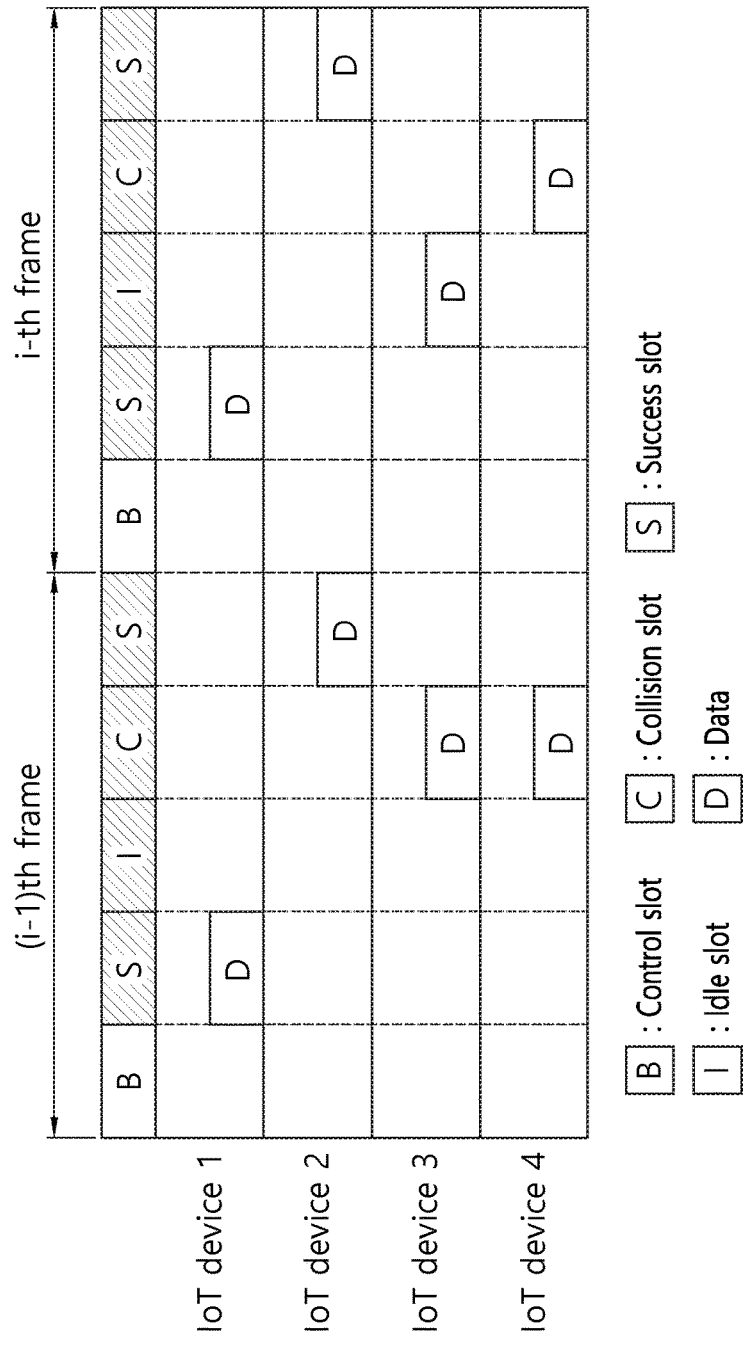
FIG. 1 is a diagram illustrating an operation example of a conventional F-ALOHA protocol.
Figure 2:
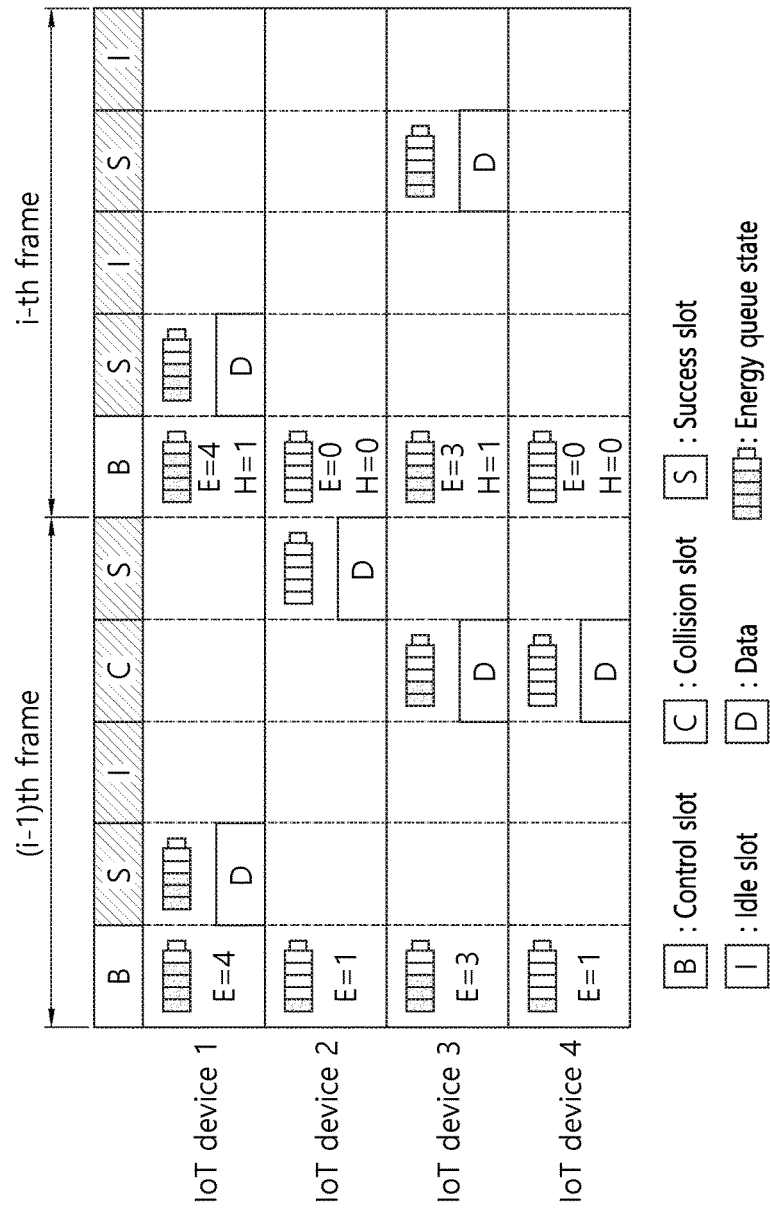
FIG. 2 is a diagram illustrating an operation example of an F-ALOHA protocol to which energy harvesting is applied.

The present invention may be variously changed and have several exemplary embodiments, and specific exemplary embodiments are illustrated in the drawings and a detailed content for executing the invention is described in detail. While the present invention may be embodied in many different forms, specific embodiments of the present invention are shown in drawings and are described herein in detail with the understanding that the present invention is to be considered as an exemplification of the principles of the invention and is not intended to limit the invention to the specific embodiments illustrated.

A term of a first, a second and a third may be used for describing various elements, but such elements are not limited by such terms. The terms are used for distinguishing one constituent element from another constituent element. For example, a first constituent element may be referred to as a second constituent element without deviating from the scope of the present invention and similarly, a second constituent element may be referred to as a first constituent element. A term "and/or" includes a combination of a plurality of related described elements or any element of a plurality of related described elements.

When it is described that a constituent element is "connected" or "accessed" to another constituent element, the element may be "directly connected" or "directly accessed" to the other constituent elements or may be "connected" or "accessed" to the other constituent elements through a third element. However, when it is described that a constituent element is "directly connected" or "directly accessed" to another constituent element, no element may exist between the element and the other constituent elements.

Terms used in the present application are used for describing a specific exemplary embodiment and do not limit the present invention. When using in a description of the present invention and the appended claims, a singular form includes a plurality of forms, unless it is explicitly differently represented. Further, in the present application, a term "comprise" or "have" indicates presence of a characteristic, a numeral, a step, an operation, an element, a component, or a combination thereof described in a specification and does not exclude presence or addition of at least another characteristic, numeral, step, operation, element, component, or combination thereof.

Unless differently defined, entire terms used here including a technical or scientific term have the same meaning as a meaning that may be generally understood by a person of common skill in the art. It should be analyzed that terms defined in a generally using dictionary have a meaning corresponding with that of a context of related technology and are not analyzed as an ideal or excessively formal meaning unless explicitly defined.

Hereinafter, exemplary embodiments of the present invention will be described in detail with reference to the accompanying drawings, like reference numerals designate like elements throughout the specification, and a duplicate description thereof will be omitted.

Method for Energy Adaptive Resource Allocation in Energy Harvesting IoT Network

An Energy-adaptive Hybrid Medium Access Control (EH-MAC) protocol, which is an exemplary embodiment of the present invention assumes an environment in which the N number of IoT devices transmit data to one AP. When transmitting data, IoT devices include energy queue state information and an average energy harvesting rate thereof in data and transmit the data to the AP. An energy harvesting rate means the number of slots necessary for harvesting one energy block. When transmitting one data packet, the IoT device uses one energy block and performs energy harvesting at every slot to acquire a unit energy block with a probability of $P_h$. When starting a frame, IoT devices generate a data packet including energy information that reflects harvested energy for a previous frame and average energy harvesting rate. When energy does not exceed a specific threshold value $E_{min}$, the IoT devices do not transmit data at a corresponding frame but perform only energy harvesting to increase energy. In an EH-MAC protocol suggested in the present invention, $E_{min}$ is set to 0.

A frame structure of the EH-MAC protocol is configured with a control slot, non-competition slots, and competition slots. In a frame, slots are allocated in order of a control slot, non-competition slots, and competition slots. The control slot is a slot in which the AP transmits control information to IoT devices, and the control information includes a size of a corresponding frame, the number of competition slots, the number of non-competition slots, division of a success/collision/idle state at a competition slot of a previous frame, and IoT device allocation information to transmit at non-competition slots. The non-competition slot is a slot in which the AP allocates a specific IoT device at a specific frame. The non-competition slot is allocated to an IoT device succeeded in data transmission at a previous frame and may be allocated only to an IoT device whose energy exceeds a specific threshold value.

The competition slot may be divided into a success slot S, a collision slot C, and an idle slot I according to a transmission result. An IoT device (device that exceeds an energy threshold value ($E>E_{min}$)) that transmits data at a collision slot at a competition segment in an any (i−1)th frame and an IoT device whose energy exceeds a threshold value ($E>E_{min}$) through energy harvesting among IoT devices having energy of a threshold value or less ($E<E_{min}$) in an (i−1)th frame, receive allocation of competition slots at an i-th frame.

When energy harvesting is succeeded, the IoT device updates an average energy harvesting rate. The AP receives data including an average energy harvesting rate from the IoT device and updates the average energy harvesting rate of the IoT device. When the IoT device succeeds data transmission at a non-competition slot or a competition slot and when energy thereof does not exceed a threshold value $E_{min}$, the AP estimates a frame in which the IoT device is to obtain energy later and is to transmit data through an average energy harvesting rate and allocates a competition slot. When the IoT device does not succeed even one time in data transmission to the AP due to collision or energy shortage, the AP regards the IoT device as an IoT device whose average energy harvesting rates are unknown and fixedly allocates the competition slots corresponding to the number of IoT devices. As the IoT device fails in data transmission at the competition slot, even in a case in which energy thereof declines to an energy threshold value $E_{min}$ or less, the AP estimates a frame expected to transmit at a next time and allocates a competition slot through an average energy harvesting rate.

Figure 3:
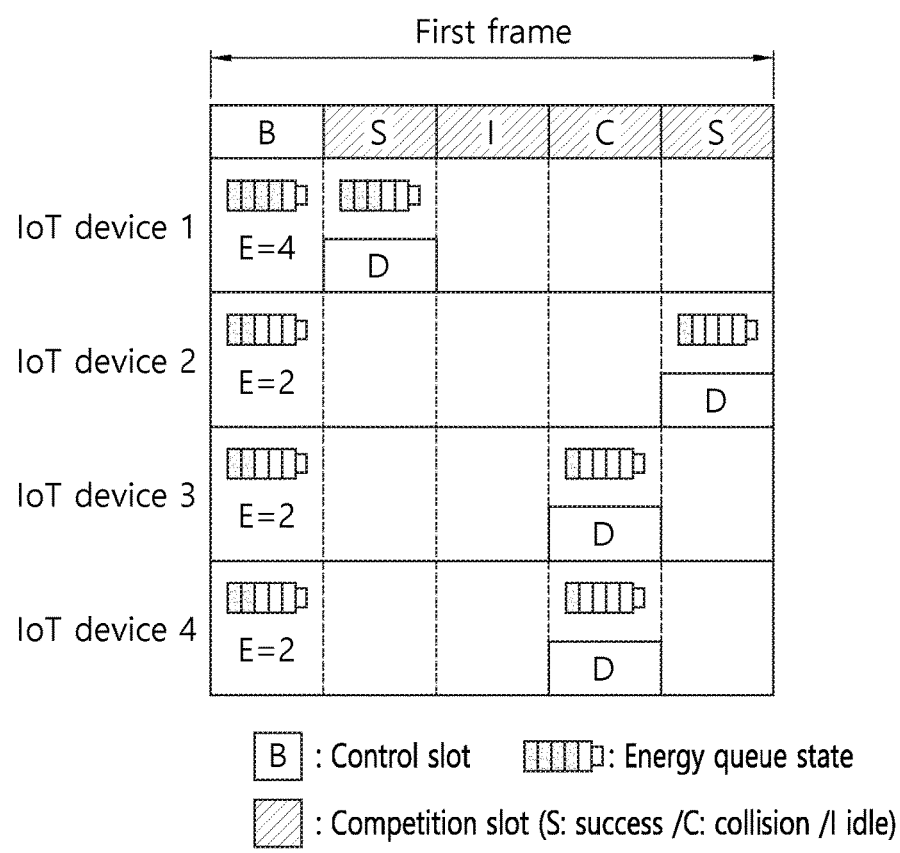
FIG. 3 is a diagram illustrating an operation example of a first frame of an EH-MAC protocol according to an exemplary embodiment of the present invention.

FIG. 3 illustrates an operation example of a first frame of an EH-MAC protocol. FIG. 3 illustrates an environment in which four IoT devices transmit data to an IoT AP. In the EH-MAC protocol, the AP may know the number of IoT devices connected through a connection procedure. The AP configures all slots, except for a control slot of a first frame with a competition slot, and the competition slots of the first frame are allocated to correspond to the number of connected IoT devices. Initial energy of IoT device 1 is 4, and only IoT device 1 transmits data at a first competition slot of the frame, succeeds in data transmission, and consumes one energy block. Therefore, after data transmission, energy of the IoT device 1 becomes 3. Only IoT device 2 selects a fourth competition slot to succeed in data transmission and consumes one energy block, and after data transmission, energy of IoT device 2 becomes 1. IoT devices 3 and 4 simultaneously select a third competition slot of the first frame to collide, and after data transmission, respective energies of IoT devices 3 and 4 become 1.

Figure 4:
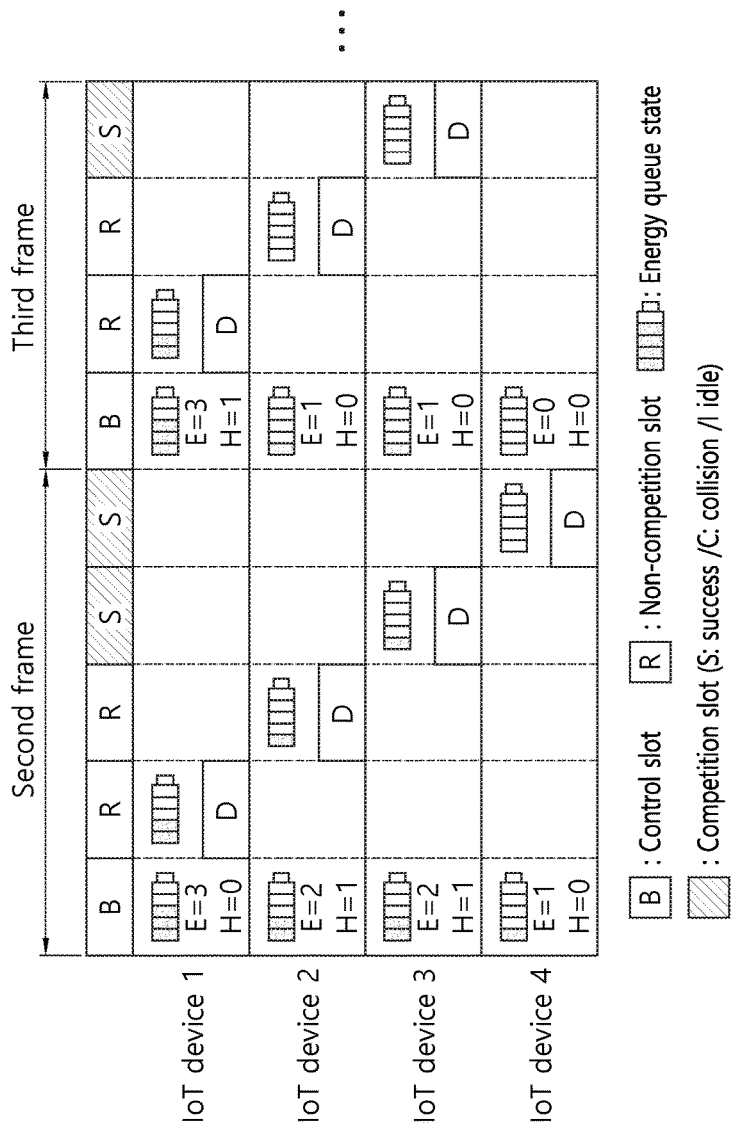
FIG. 4 is a diagram illustrating an operation example of second and third frames of an EH-MAC protocol according to an exemplary embodiment of the present invention.

FIG. 4 is a diagram illustrating an operation example of second and third frames of an EH-MAC protocol following FIG. 3. The AP allocates slots of a second frame using received energy information and information of a success slot and a collision slot at the first frame. IoT devices 1 and 4 do not obtain energy through energy harvesting at the first frame and respective energies thereof become 3 and 1, and IoT devices 2 and 3 increase one energy block through energy harvesting at the first frame and thus both energies thereof become 2. IoT device 1 and 2 receive allocation of a non-competition slot at the second frame and succeed in data transmission, and by using one energy block in data transmission, respective energies thereof become 2 and 1. IoT devices 3 and 4 select a random slot among competition slots of the second frame to transmit data respectively. IoT devices 3 and 4 select different slots and succeed in data transmission, and after data transmission, respective energies thereof become 1 and 0.

At a third frame, IoT devices 1 and 2 receive allocation of a non-competition slot and succeed in data transmission. Because at least one competition slot should exist in a frame, when the AP determines that an IoT device to transmit does not exist at a competition slot, the IoT device succeeded in data transmission at a previous frame transmits data at the competition slot. Therefore, IoT device 3 receives allocation of the competition slot and succeeds in data transmission. After transmitting data at the second frame, because an energy queue state does not exceed an energy threshold value, IoT device 4 does not transmit data at the third frame. IoT device 4 performs only energy harvesting at the third frame to increase energy. The AP does not allocate a non-competition slot to IoT device 4 not to waste a resource. After data transmission at the third frame, because energy of IoT devices 2 and 3 do not exceed an energy threshold value, IoT devices 2 and 3 do not transmit data at a fourth frame. The AP allocates a non-competition slot of the fourth frame in consideration of a harvested energy amount of IoT devices at the third frame. Thereafter, the EH-MAC protocol adjusts IoT devices allocated to a non-competition slot and a frame length adaptively to the number of IoT devices that attempt transmission in consideration of energy harvesting, thereby improving resource efficiency.

Figure 5:
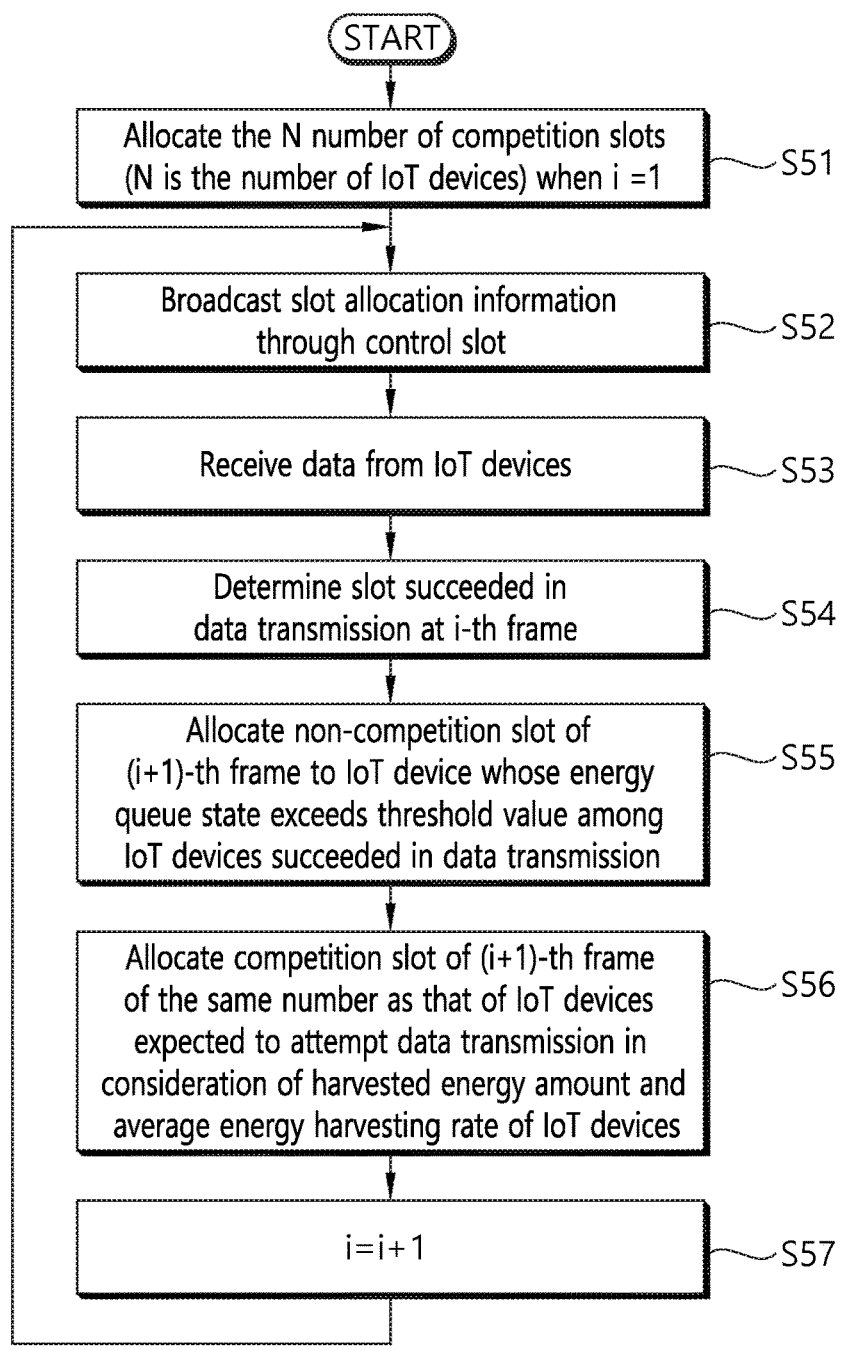
FIG. 5 is a flowchart illustrating operation of an EH-MAC protocol from an AP viewpoint according to an exemplary embodiment of the present invention.

FIG. 5 is a flowchart illustrating operation of an EH-MAC protocol from an AP viewpoint. The AP determines the number of connected IoT devices at a first frame (i=1), allocates competition slots to the entire one frame (S51) and broadcasts slot allocation information to the N number of IoT devices through a control slot (S52). Thereafter, the AP receives data from IoT devices (S53) and determines slots succeeded in data transmission at an i-th frame (S54). Thereafter, the AP allocates a non-competition slot at an (i+1)-th frame in consideration of an energy queue state of IoT devices and slots succeeded in data transmission at the i-th frame (S55). The AP allocates competition slots corresponding to the number of IoT devices expected to attempt data transmission in consideration of an average energy harvesting rate and an energy amount of IoT devices that do not receive allocation of the non-competition slot at an i-th frame and transmits data to IoT devices through a control slot of an (i+1)-th frame (S56).

Figure 6:
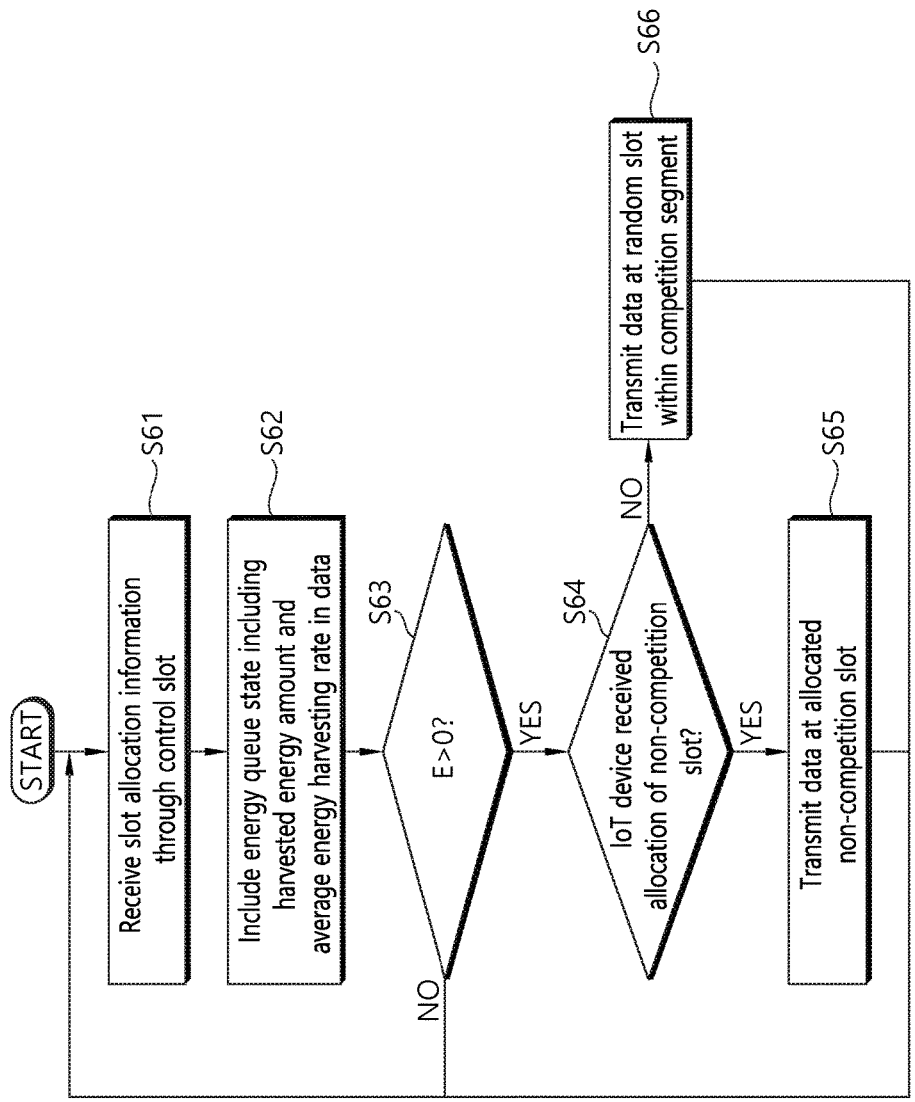
FIG. 6 is a flowchart illustrating operation of an EH-MAC protocol from an IoT device viewpoint according to an exemplary embodiment of the present invention.

FIG. 6 is a flowchart illustrating operation of an EH-MAC protocol from an IoT device viewpoint. The IoT device receives control information from an AP through a control slot with the start of the frame to receive a frame length, slot allocation information, and a synchronization signal (S61). The IoT devices measure energy, calculate an average energy harvesting rate, and include the calculated average energy harvesting rate in data (S62). Thereafter, the IoT device determines whether an energy queue state thereof exceeds a threshold value (S63), and if an energy queue state thereof exceeds a threshold value, the IoT device determines whether an allocated slot is a non-competition slot or a competition slot (S64) and attempts data transmission at a corresponding slot (S65 or S66). If an energy queue state thereof is equal to or smaller than a threshold value, at the corresponding frame, the IoT device does not transmit data but performs only energy harvesting and is on standby.

Hereinafter, an energy adaptive resource allocation apparatus in an energy harvesting IoT network, which is another exemplary embodiment of the present invention will be described.

Figure 9:
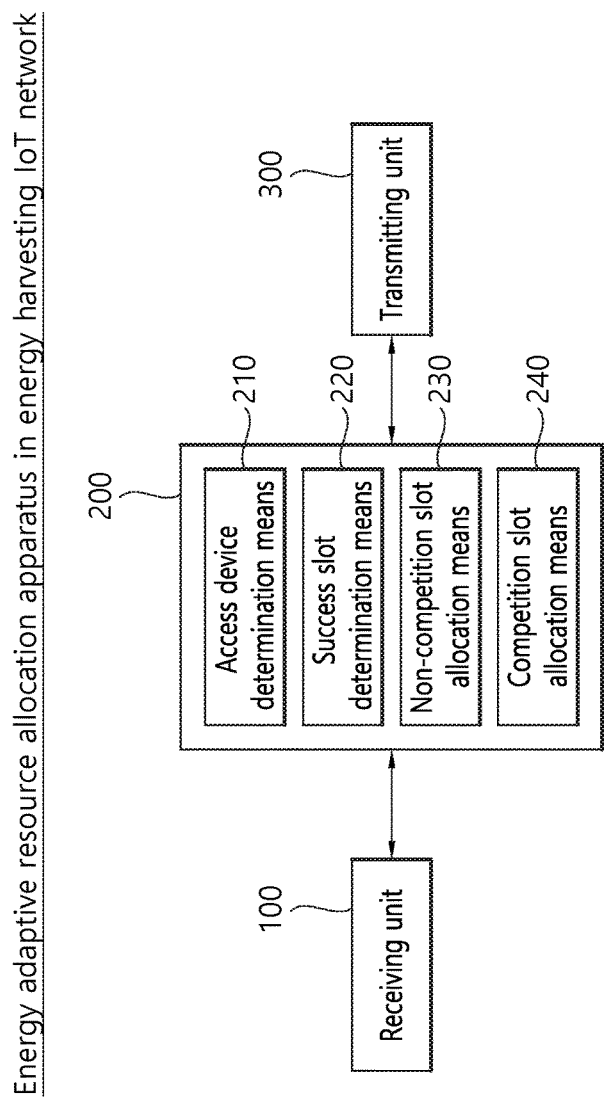
FIG. 9 is a schematic block diagram of an energy adaptive resource allocation apparatus in an energy harvesting IoT network according to an exemplary embodiment of the present invention.

Energy Adaptive Resource Allocation Apparatus in an Energy Harvesting IoT Network FIG. 9 is a schematic block diagram of an energy adaptive resource allocation apparatus in an energy harvesting IoT network according to an exemplary embodiment of the present invention.

Referring to FIG. 9, an energy adaptive resource allocation apparatus 10 in an energy harvesting IoT network, which is another exemplary embodiment of the present invention includes a receiving unit 100, a slot allocation unit 200, and a transmitting unit 300.

The receiving unit 100 receives data including an average energy harvesting rate and an energy queue state including a harvested energy amount from IoT devices.

The slot allocation unit 200 includes an access device determination means 210, a success slot determination means 220, a non-competition slot allocation means 230, and a competition slot allocation means 240.

The access device determination means 210 determines the number of IoT devices accessed to the energy adaptive resource allocation apparatus 10. At a first frame, the competition slot allocation means 240 allocates competition slots corresponding to the determined number of accessed IoT devices.

The success slot determination means 220 determines slots succeeded in data transmission at a current frame.

The non-competition slot allocation means 230 allocates a non-competition slot of a next frame to each of IoT devices whose energy queue state exceeds a threshold value among IoT devices succeeded in data transmission.

The competition slot allocation means 240 allocates competition slots at a next frame with the same number as that of IoT devices expected to attempt data transmission in consideration of an average energy harvesting rate and a harvested energy amount of IoT devices that do not receive allocation of the non-competition slot.

The transmitting unit 300 broadcasts control information including a synchronization signal, a size of a corresponding frame, the number of competition slots, the number of non-competition slots, and division of a success/collision/idle state at a competition slot of a previous frame at a control slot, and IoT device allocation information to transmit at a non-competition slot to IoT devices.

Hereinafter, a performance of the present invention is suggested based on a performance evaluation result through a simulation.

Performance Evaluation Through Simulation

In a network environment in which the N number of IoT devices whose data queue is in a saturation state and one AP communicate, a simulation was performed in a state in which a magnitude $E_{max}$ of an energy queue is set to 5 and in which an energy threshold value $E_{min}$ is set to 1 and in which an initial energy queue state $E_{init}$ is set to 5, as shown in Table 1.

TABLE 1

| Parameter | Value |
| --- | --- |
| N | 10-150 |
| $P_h$ | 0.01-1 |
| $E_{min}$ | 1 |
| $E_{init}$ | 5 |
| $E_{max}$ | 5 |
| Frame size in F-ALOHA | 10-150 |

In throughput performance comparison of an EH-MAC protocol according to a change of $P_h$, when a range of $P_h$ is 0.01-1, a simulation was performed, and when N is changed to 10, 30, 50, 100, and 150, an effect was determined. In performance comparison of a suggested EH-MAC protocol and an existing F-ALOHA MAC protocol according to the change in the number of IoT devices, while changing the number of IoT devices from 10 to 150, performance evaluation was performed, and a throughput performance when $P_h$ changes to 0.01, 0.03, 0.05, 0.07, and 0.09 was determined.

Figure 7:
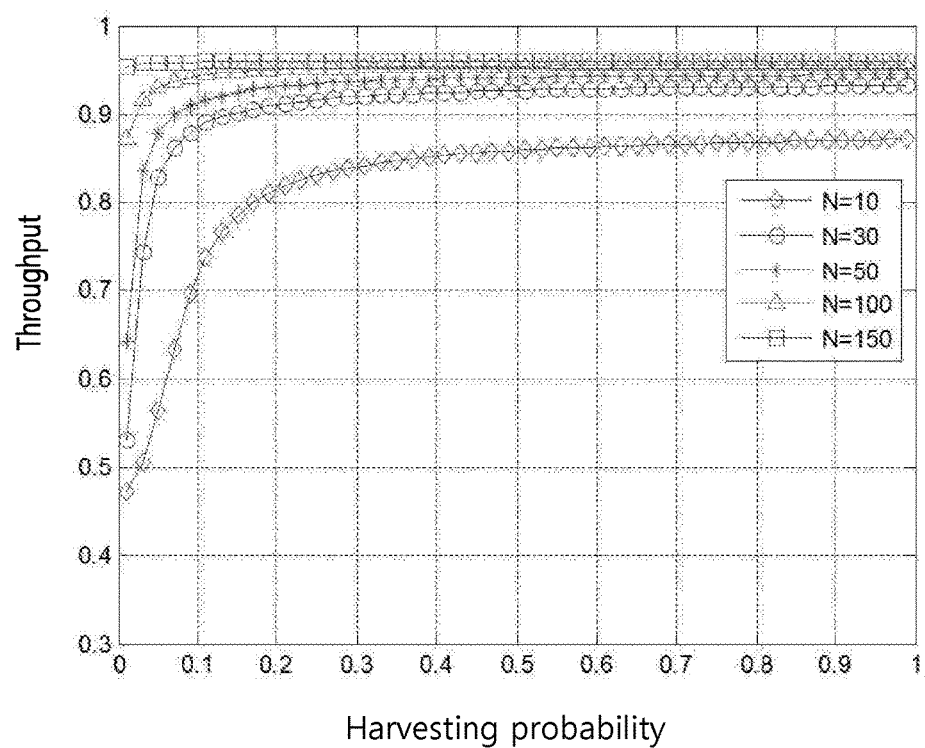
FIG. 7 is a graph illustrating an evaluation result of a processing rate of an exemplary embodiment of the present invention according to an energy harvesting probability.

FIG. 7 illustrates an evaluation result of a throughput of an EH-MAC protocol according to a harvesting probability in an energy harvesting IoT network. As a harvesting probability increases, a throughput of an EH-MAC protocol gradually arrives at a saturation state. This is because when a harvesting probability increases, a harvested energy amount per frame of an IoT device increases and the number of devices that receive allocation of non-competition slots in a frame increases. Further, as the number of IoT devices increases, a throughput performance increases. When the number of IoT devices increases, a frame length increases and a harvesting opportunity increases (i.e., because IoT devices perform energy harvesting with a probability of $P_h$ at every slot, when the number of slots within the frame increases, an opportunity that can perform energy harvesting increases) and thus the IoT device may harvest much energy, and because an IoT device, having transmitting data at a non-competition slot has enough energy, the IoT device may continuously transmit data at the non-competition slot. When the number of IoT devices is 150, a frame length is fully long and thus at a segment 0.01-0.1 having a small energy harvesting probability, the IoT device has a high throughput performance.

Figure 8:
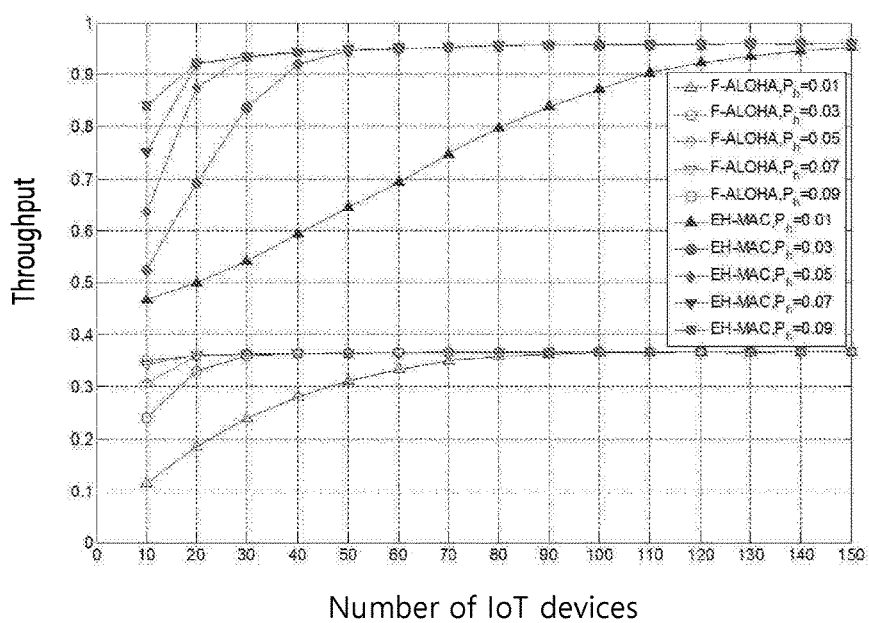
FIG. 8 is a graph illustrating a processing rate performance according to a change in the number of IoT devices of the conventional art and an exemplary embodiment of the present invention.

FIG. 8 illustrates an evaluation result of a throughput performance of an F-ALOHA protocol and an EH-MAC protocol according to the number of IoT devices. As the number of IoT devices increases, a throughput performance of both an F-ALOHA protocol and an EH-MAC protocol gradually arrives in a saturation state. This is because as the number of IoT devices increases, a frame length increases and an energy amount harvested per frame of the IoT device increases. Therefore, IoT devices receive allocation of non-competition slots at the frame to transmit data and a throughput performance increases. Similarly to FIG. 7, as a harvesting probability per slot increases, it may be determined that a throughput performance is enhanced. Because the F-ALOHA protocol has a fixed frame length, the IoT device does not efficiently use a resource according to an energy queue state change thereof and thus it may be determined that a throughput performance is lower than that of the EH-MAC protocol.

Exemplary embodiments of the present invention have been described for IoT devices, but may be applied to other wireless communication devices including cellular phones, PDAs (Personal Digital Assistants), Notebook computers, Tablet computers, etc.

A plurality of exemplary embodiments of the present invention have been described. While the present invention has been particularly shown and described with reference to exemplary embodiments thereof, it will be understood by those skilled in the art that various changes in form and details may be made therein without departing from the spirit and scope of the invention as defined by the appended claims. Additionally, because some of the foregoing steps are order independent, some steps may be performed in order different from the described order.

What is claimed is:

1. A method for energy adaptive resource allocation in energy harvesting network, the method comprising:
   allocating, by an energy adaptive resource allocation apparatus, non-competition slots of a next frame to at least one first wireless communication device whose energy queue state exceeds a predetermined threshold value among wireless communication devices succeeded in data transmission; and
   allocating, by the energy adaptive resource allocation apparatus, competition slots of the same number as that of at least one third wireless communication device expected to attempt data transmission to the next frame in consideration of a harvested energy amount and an average energy harvesting rate of at least one second wireless communication device.

2. The method of claim 1, wherein the at least one second wireless communication device is a wireless communication device that does not receive allocation of the non-competition slots among wireless communication devices connected to the energy adaptive resource allocation apparatus.

3. The method of claim 1, further comprising determining, by the energy adaptive resource allocation apparatus, slots succeeded in data transmission at a current frame.

4. The method of claim 1, further comprising allocating competition slots corresponding to the number of wireless communication devices that are connected to the energy adaptive resource allocation apparatus to a first frame.

5. The method of claim 1, further comprising broadcasting, by the energy adaptive resource allocation apparatus, control information to wireless communication devices connected to the energy adaptive resource allocation apparatus at a control slot.

6. The method of claim 5, wherein the control information comprises at least one of a synchronization signal, a size of a corresponding frame, the number of competition slots, the number of non-competition slots, and a data transmission state at a competition slot of a previous frame, wherein the data transmission state comprises success, collision, and idle, and an information of wireless communication devices to transmit at the non-competition slots.

7. The method of claim 1, further comprising receiving, by the energy adaptive resource allocation apparatus, data including an average energy harvesting rate and an energy queue state having an energy amount harvested from the at least one first and at least one third wireless communication devices.

8. The method of claim 7, wherein wireless communication devices succeeded in energy harvesting update the average energy harvesting rate when succeeding in energy harvesting.

9. The method of claim 1, wherein when the wireless communication device connected to the energy adaptive resource allocation apparatus is unsuccessful even one time in data transmission to the energy adaptive resource allocation apparatus due to collision or energy shortage, the energy adaptive resource allocation apparatus fixedly allocates competition slots corresponding to the number of the unsuccessful wireless communication devices, average energy harvesting rates of which are unknown.

10. An energy adaptive resource allocation apparatus in an energy harvesting network, the energy adaptive resource allocation apparatus comprising:
    a slot allocation unit that allocates non-competition slots and competition slots of a next frame in consideration of an energy amount and an average energy harvesting rate of wireless communication devices.

11. The energy adaptive resource allocation apparatus of claim 10, wherein the slot allocation unit allocates non-competition slots of a next frame to at least one first wireless communication device whose energy queue state exceeds a predetermined threshold value among wireless communication devices succeeded in data transmission and allocates competition slots of the same number as that of at least one third wireless communication device expected to attempt data transmission to the next frame in consideration of a harvested energy amount and an average energy harvesting rate of at least one second wireless communication device.

12. The energy adaptive resource allocation apparatus of claim 11, wherein the at least one second wireless communication device is a wireless communication devices that does not receive allocation of the non-competition slots among wireless communication devices connected to the energy adaptive resource allocation apparatus.

13. The energy adaptive resource allocation apparatus of claim 11, wherein the slot allocation unit determines slots succeeded in data transmission at a current frame.

14. The energy adaptive resource allocation apparatus of claim 13, wherein the slot allocation unit allocates competition slots corresponding to the number of connected wireless communication devices at a first frame.

15. The energy adaptive resource allocation apparatus of claim 11, further comprising a transmitting unit that broadcasts control information to the connected wireless communication devices at a control slot.

16. The energy adaptive resource allocation apparatus of claim 15, wherein the control information comprises at least one of a synchronization signal, a size of a corresponding frame, the number of competition slots, the number of non-competition slots, and a data transmission state at a competition slot of a previous frame, wherein the data transmission state comprises success, collision, and idle, and an information of wireless communication devices to transmit at the non-competition slots.

17. The energy adaptive resource allocation apparatus of claim 11, further comprising a receiving unit that receives data including an average energy harvesting rate and an energy queue state having an energy amount harvested from the at least one first and at least one third wireless communication devices.

18. The energy adaptive resource allocation apparatus of claim 17, wherein wireless communication devices succeeded in energy harvesting update the average energy harvesting rate when succeeding in energy harvesting.

19. The energy adaptive resource allocation apparatus of claim 11, wherein when the wireless communication device connected to the energy adaptive resource allocation apparatus is unsuccessful even one time in data transmission to the energy adaptive resource allocation apparatus due to collision or energy shortage, the slot allocation unit fixedly allocates competition slots corresponding to the number of the unsuccessful wireless communication devices, average energy harvesting rates of which are unknown.

* * * * *